US009298273B2

(12) United States Patent
Shao et al.

(10) Patent No.: US 9,298,273 B2
(45) Date of Patent: Mar. 29, 2016

(54) INPUT DEVICE HAVING GROOVES AND CORRESPONDING SENSING UNITS

(71) Applicants: Beijing Lenovo Software Ltd., Beijing (CN); Lenovo (Beijing) Co., Ltd., Beijing (CN)

(72) Inventors: Xiang Shao, Beijing (CN); Qing Liu, Beijing (CN); Jinping Yang, Beijing (CN); Qi Li, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 41 days.

(21) Appl. No.: 14/230,213

(22) Filed: Mar. 31, 2014

(65) Prior Publication Data

US 2015/0077343 A1 Mar. 19, 2015

(30) Foreign Application Priority Data

Sep. 13, 2013 (CN) .......................... 2013 1 0419117
Sep. 18, 2013 (CN) .......................... 2013 1 0430438

(51) Int. Cl.
*G06K 9/00* (2006.01)
*G06F 3/00* (2006.01)
*G06F 1/16* (2006.01)
*G06F 3/02* (2006.01)

(52) U.S. Cl.
CPC ............ *G06F 3/0221* (2013.01); *G06F 1/1662* (2013.01); *G06F 3/005* (2013.01); *G06F 3/0202* (2013.01); *G06K 9/0002* (2013.01); *G06F 2203/04809* (2013.01)

(58) Field of Classification Search
CPC .............. G06F 1/1624; G06F 1/1662–1/1671; G06F 3/02–3/0224; G06F 3/005; G06K 9/0006–9/00046
See application file for complete search history.

(56) References Cited

U.S. PATENT DOCUMENTS

| 5,917,437 A | * | 6/1999 | Ojala et al. ...................... 341/34 |
| 2004/0075588 A1 | * | 4/2004 | Wang et al. ...................... 341/22 |

FOREIGN PATENT DOCUMENTS

| CN | 201662772 U | | 12/2010 |
| CN | 202736803 U | | 2/2013 |
| CN | 103021709 A | * | 4/2013 |
| DE | 102009032614 a1 | | 1/2011 |

OTHER PUBLICATIONS

First Chinese Office Action regarding Application No. 201310430438.9 dated Jan. 29, 2016. English translation provided by Unitalen Attorneys at Law.

* cited by examiner

*Primary Examiner* — Larry Sternbane
(74) *Attorney, Agent, or Firm* — Harness, Dickey & Pierce, P.L.C.

(57) ABSTRACT

An input device is provided in the present application. The input device includes a first panel and a second panel, the first panel is provided with multiple grooves; the second panel is located under the first panel or fused to a bottom of the first panel, and includes a sensing unit configured to sense a key. In the input device, each of the grooves is arranged to correspond to one key area, and a key command may be input by performing a touch key operation on a corresponding sensing unit under the groove. Compared with the conventional input device, in the input device of the present application, the input of the key command may be realized without key caps and scissor-shaped structures for supporting the key caps, thereby shortening the key travel and reducing the thickness of the input device.

20 Claims, 8 Drawing Sheets

INPUT DEVICE HAVING GROOVES AND CORRESPONDING SENSING UNITS

The present application claims the benefit of priorities to Chinese patent application No. 201310419117.9, titled "GLASS KEYBOARD", filed with the Chinese State Intellectual Property Office on Sep. 13, 2013 and Chinese patent application No. 201310430438.9, titled "INPUT DEVICE AND ELECTRONIC DEVICE HAVING THE SAME", filed with the Chinese State Intellectual Property Office on Sep. 18, 2013, the entire disclosures of which are incorporated herein by reference.

TECHNICAL FIELD

The present application relates to the technical field of Human-Computer Interaction Device, particularly to an input device.

BACKGROUND

A keyboard, as one of input devices for a computer, has entered into people's daily life. Generally, an input device includes keys and key caps which are independent from each other. When using this kind of keyboard to input operation commands, different key caps are tapped to input corresponding key commands. However, since the input device including keys and key caps has a longer key travel, the input device generally has a larger thickness, which does not conform to the modern idea for manufacturing ultra-thin electronic devices.

SUMMARY

An input device and an electronic device having the input device are provided in the present application, and the input device has a small thickness.

The present application provides the following technical solutions.

An input device includes:
a first panel, provided with multiple grooves; and
a second panel, located under the first panel or fused to a bottom of the first panel, and the second panel includes a sensing unit configured to sense a key.

Preferably, in the input device,
a number of the grooves provided on the first panel is M, and M is an integer that is greater than 1 or equal to 1; and
a number of the sensing units provided on the second panel is N, and N is an integer that is greater than 1 or equal to 1, and is not less than M.

Preferably, the input device further includes silica gel pad arranged in the groove.

Preferably, in the input device, in a case that the second panel is located under the first panel, the second panel and the first panel are detachable panels.

Preferably, in the input device, a bottom of the silica gel pad is provided with a conductive rubber, and in a case that the silica gel pad is pressed, the conductive rubber is in contact with a sensing unit, corresponding to the groove provided with the silica gel pad, to perform a trigger operation.

Preferably, in the input device, a bottom of the silica gel pad is provided with a metallic contact unit, and in a case that the silica gel pad is pressed, the metallic contact unit is in contact with a sensing unit, corresponding to the groove provided with the silica gel pad, to perform a trigger operation.

Preferably, in the input device, in a case that the second panel is fused to a bottom of the first panel, the N sensing units are partitioned to a plurality of sections, and a plurality of sensing units located in the same section are arranged at the same capacitor plate; and each capacitor plate corresponds to one controller.

Preferably, in the input device, the plurality of sensing units located in the same capacitor plate are partitioned according to a frequency of use of each of the keys corresponding to the sensing units, and the capacitor plate is divided into a plurality of capacitor sub-plates which are manufactured separately.

Preferably, in the input device, a height of the silica gel pad is not greater than a height of the groove.

Preferably, in the input device, the first panel is a glass plate.

Preferably, in the input device, the silica gel pad is a transparent silica gel pad.

Preferably, in the input device, a key marking is arranged in the silica gel pad or on a surface of the silica gel pad.

Preferably, in the input device, the input device is configured to be integrated with an electronic device which requires a mechanical key; and in this case, M is less than N.

Preferably, in the input device, the input device is configured as an external input device for an electronic device, or is configured to be integrated with an electronic device without a mechanical key; and in this case, M equals to N.

Preferably, in the input device, the first panel is a glass panel; the input device further includes an acquisition device configured to acquire an input operation of a user; the plurality of grooves are arranged on the glass panel, and each groove corresponds to one key; and the acquisition device is arranged in the groove on the glass panel.

Preferably, in the input device, the acquisition device further includes a silica gel and an image acquisition device, and the image acquisition device is arranged below the silica gel, and is configured to capture an image of a fingerprint of the user in a case that the user operates at the silica gel with his finger.

Preferably, in the input device, the acquisition device further includes:
a pressure sensor, which is arranged below the silica gel to sense a pressure applied on the silica gel by the finger of the user; and in a case that a value of the pressure sensed by the press sensor is greater than a set pressure value, the image acquisition device captures the image of the fingerprint of the user.

Preferably, in the input device, the acquisition device includes a lens and an image acquisition device, wherein the lens is arranged at a bottom of the groove to image the user's fingerprint, and the image acquisition device is arranged below the lens, and is configured to capture an image of the user's fingerprint in a case that the user operates on the lens with his finger.

Preferably, in the input device, the acquisition device includes:
a convex mirror, configured to image the user's fingerprint; and
an image acquisition device, arranged below the convex mirror and configured to capture an image of the user's fingerprint in a case that the user operates on the convex mirror with his finger.

Preferably, in the input device, the acquisition device is provided in each groove on the glass panel.

Preferably, in the input device, the acquisition device is arranged in a groove, corresponding to a set key, on the glass panel.

Preferably, in the input device, the glass panel is divided into at least two sections, including a first section and a second section;

the acquisition device arranged in a groove of the first section includes a silica gel and an image acquisition device arranged below the silica gel and configured to capture an image of a fingerprint of the user in a case that the user operates on the silica gel with his finger; and the acquisition device arranged in a groove of the second section includes a lens arranged at a bottom of the groove, and an image acquisition device configured to capture the image of the fingerprint of the user in a case that the user operates on the lens with his finger or to capture an input gesture of the user.

The present application further provides an electronic device, which includes:

a display device, configured to display data; and an input device, integrated with the display device and configured to input data;

wherein, the input device includes a first panel and a second panel, the first panel is provided with M grooves, M is an integer that is greater than 1 or equal to 1; the second panel is located under the first panel or fused to a bottom of the first panel, and the second panel includes N sensing units each configured to sense a key, and N is an integer that is greater than 1 or equal to 1, and is not less than M.

Preferably, in the electronic device, the electronic device is a laptop, and the input device is an integrated keyboard of the laptop.

In the input device according to the above technical solutions, each of the grooves is arranged to correspond to one key area, and a key command may be input by performing a touch key operation on a corresponding sensing unit under the groove. Compared with the conventional input device, in the technical solutions of the present application, the input of the key command may be realized without key caps and scissor-shaped structures for supporting the key caps, thereby shortening the key travel and reducing the thickness of the input device. At the same time, the groove has a function of key positioning. Therefore, an electronic device having the input device according to the technical solutions of the present application has a small thickness.

BRIEF DESCRIPTION OF DRAWINGS

For more clearly illustrating embodiments of the present application or the technical solution in the conventional technology, drawings referred to describe the embodiments or the conventional technology will be briefly described hereinafter. Apparently, the drawings in the following description are only several embodiments of the present application, and for the person skilled in the art other drawings may be obtained based on these drawings without any creative efforts.

DETAILED DESCRIPTION

The present application provides an input device having a first panel and a second panel. The first panel is provided with multiple grooves; the second panel is located under the first panel or fused to a bottom of the first panel, and the second panel includes a sensing unit configured to sense a key. The input device according to the present application has a small thickness.

For more clearly illustrating the objects, features and advantages of the present application, implementation manners of the present application will be described in detail hereinafter in conjunction with drawings.

First Embodiment

The present application provides an input device including a first panel and a second panel.

The first panel is provided with M grooves, and M is an integer greater than 1 or equal to 1. Each of the grooves corresponds to a key area.

The second panel includes N sensing units each being configured to sense a key, that is, the second panel includes N sensing touch spots each being configured to sense a key, and each sensing touch spot corresponds to a key operation. N is an integer greater than 1 or equal to 1, and is not less than M. The second panel may be provided under the first panel or fused to a bottom of the first panel.

The input device according to this embodiment may utilize the touch control principle. The first panel generally employs a glass panel having a great hardness, thus is apt to lead to fatigue in a user's fingers. In order to improve the comfort for the user during the key operation, the input device according to this embodiment further includes a buffering pad arranged in the groove. Preferably, the buffering pad is a silica gel pad with a great elastic recovery property.

Figure 1:
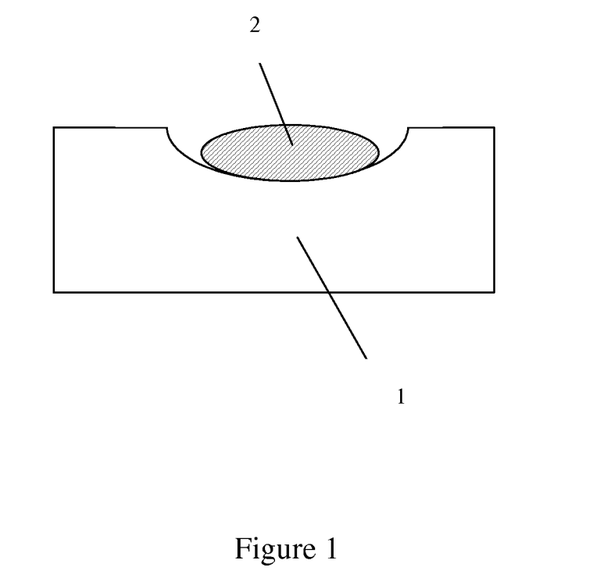
FIG. 1 is a schematic view showing the structure of an input device according to an embodiment of the present application, wherein a silica gel pad has a height less than a height of a groove of a first panel.
Figure 2:
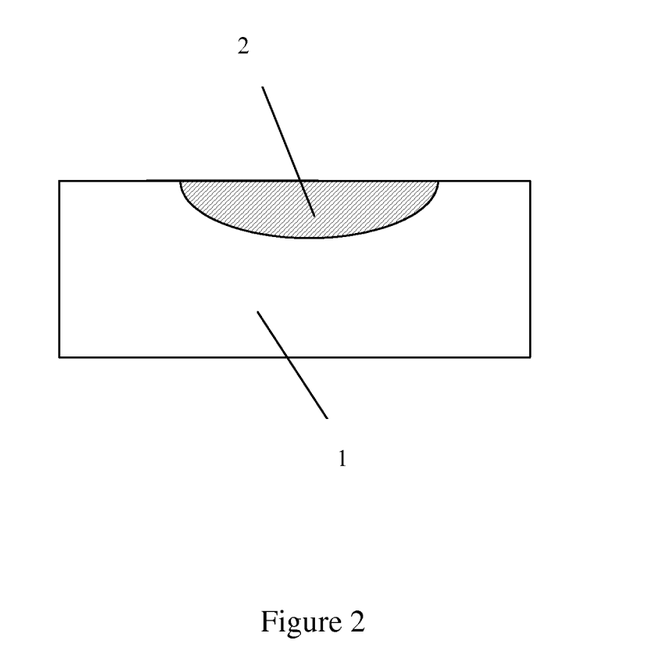
FIG. 2 is a schematic view showing the structure of an input device according to an embodiment of the present application, wherein a silica gel pad has a height equal to a height of a groove of a first panel.

In order to prevent the thickness of the input device from being increased due to the silica gel pad having a large thickness, a height of the silica gel pad is not greater than that of the groove. As shown in FIG. 1, a height of a silica gel pad 2 may be less than that of a groove in a first panel 1; and as shown in FIG. 2, the height of the silica gel pad 2 may be equal to that of the groove in the first panel 1. The height relationship between the silica gel pad 2 and the groove refers to the height relationship between a position of the highest point of the silica gel pad 2 and a position of a plane in which an opening of the groove is located.

Figure 3:
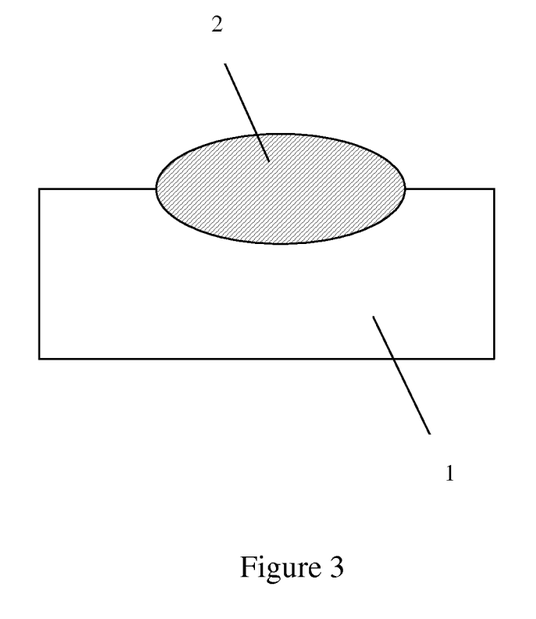
FIG. 3 is a schematic view showing the structure of an input device according to an embodiment of the present application, wherein a silica gel pad has a height greater than a height of a groove of a first panel.

The implementation manners of the input device shown in FIGS. 1 and 2 are merely examples of the application of this embodiment, and in other implementation manners, in order to facilitate touching keys for the user, the height of the silica gel pad 2 may also be greater than that of the groove in the first panel 1, that is, a top of the silica gel pad 2 may overtop the opening of the groove, in which the silica gel pad 2 is located, and forms a protrusion outside the groove, as shown in FIG. 3.

Generally, in a case that the silica gel pad 2 overtops the groove, in which the silica gel pad 2 is located, a distance from the highest point of the silica gel pad 2 to the plane in which the groove is located is required to be not greater than 0.2 mm, considering the design of the thickness of the input device. For example, when a depth of a groove is 0.3 mm, the thickness of the silica gel pad 2 is not greater than 0.5 mm under a condition that the silica gel pad 2 is not pressed and a bottom thereof is in contact with a bottom of the groove.

Therefore, the height of the silica gel pad 2 may be designed according to various requirements. For example, the user may have a concaved touch feeling in the fingers when tapping the keys of the input device according to the implementation manner as shown in FIG. 1. The input device according to the implementation manner as shown in FIG. 2 has a better smoothness, thus has a good appearance. The input device according to the implementation manner as shown in FIG. 3 may facilitate sensing the position of the keys for the user.

In the input device according to this embodiment, each of the grooves is arranged to correspond to one key area, and a key command may be input by performing a touch key operation on a corresponding sensing unit under the groove. Compared with the conventional input device, in the technical solution of this embodiment, the input of the key command may be realized without key caps and scissor-shaped structures for supporting the key caps, thereby shortening the key travel and reducing the thickness of the input device. At the same time, the groove has a function of key positioning.

Second Embodiment

With developments of the touch control technology, although input functions of some keys are realized by touch control, some necessary mechanical keys are still remained in some electronic devices, such as various portable electronic devices. For example, at present, most of portable electronic devices still have a power key which is provided as a mechanical key, that is because the power key plays an important role in the using of portable electronic devices and has functions of waking up electronic devices, lighting up a screen and starting up or shutting down the electronic devices. Thus, the power key is a mechanical key that is still remained in most of portable electronic devices.

Based on the embodiment described above, this embodiment provides another input device configured to be integrated on an electronic device which requires a mechanical key. The input device includes a first panel having M grooves, and N sensing units each being configured to sense a key. The N sensing units include a first sensing unit configured to sense a touch key operation and a second sensing unit configured to sense a mechanical pressing key operation. The number of the grooves is less than that of the sensing units, that is, M is smaller than N.

Each first sensing unit, configured to sense the touch key operation, corresponds to one groove in the first panel; and each second sensing unit, configured to sense the mechanical pressing key operation, is provided with an independent mechanical key to trigger a control operation. In this case, the number of the sensing units is larger than that of the grooves.

This embodiment employs the ultra-thin design of the embodiment described above using the groove touch key operation, thus the input device according to this embodiment also has a small thickness. A sensing unit of the second panel includes a first sensing unit and a second unit, a design of a touch key is realized by the first sensing unit, and a design of a necessary mechanical key is realized by the second sensing unit, thus the input device may be integrated on a portable electronic device with a mechanical key.

Third Embodiment

Based on the first embodiment, this embodiment provides yet another input device, and the input device includes a first panel having M grooves, and N sensing units each being configured to sense a key. The number of the grooves equals to that of the sensing units, that is, M equals to N, and the grooves are in one-to-one correspondence with the sensing units.

The input device according to this embodiment also employs the implementation manner of groove touch key, without key caps and scissor-shaped structures, thus has a small thickness.

In the input device according to this embodiment, no mechanical key is provided to trigger an operation, all sensing units are positioned by the corresponding grooves, that is, the key sensing operations are realized by the grooves which are in one-to-one correspondence with the sensing units, thus the input device in this embodiment may be integrated on an electronic device without a mechanical key.

Furthermore, the input device according to this embodiment may be used as an external input device for an electronic device. For example, an ultra-thin keyboard manufactured according to the technical solution of this embodiment may be used as an external input device for electronic devices such as computers.

Fourth Embodiment

In the embodiments described above, in order to distinguish between functions of keys corresponding to the sensing units of the input device, a key pattern layer having key markings may be integrated into the input device according to one manner, for example a key pattern layer having various key pattern markings may be integrated into the first panel or the second panel by embedding or bonding.

Although the functions of keys of the input device may be distinguished from each other through the above manner, the difficulty of a process for manufacturing the panel is increased. Furthermore, the integrated key pattern layer may adversely affect the input precision of the keys of the input device.

In this embodiment, the key pattern marking of the input device is arranged on a surface of the silica gel pad or in the silica gel pad located in the groove of the first panel. The key pattern marking may be arranged at a top of the silica gel pad, or the key pattern marking may also be arranged in a transparent silica gel pad or at a bottom of the transparent silica gel pad, thereby preventing the key pattern marking from being worn away.

By arranging the key pattern marking of the input device on the surface of the silica gel pad or in the silica gel pad, it is not required to integrate the key pattern layer having key pattern markings into the first panel or the second panel, thus the difficulty of the process for manufacturing the panel is reduced, and the thickness of the panel is reduced, which further reduces the thickness of the input device.

Furthermore, the adverse affect on a capacitor, caused by integrating the key pattern layer into the first panel or the second panel, may be avoided, thereby ensuring the precision of key control.

The silica gel pad and the first panel may be manufactured separately, in this way, the process of arranging the key marking in the silica gel pad will not affect a manufacturing process of the first panel, thus the style of the key pattern markings, such as stereoscopic sense or color, may be arranged freely, which may improve the aesthetics and highlight selling points.

Fifth Embodiment

Figure 4:
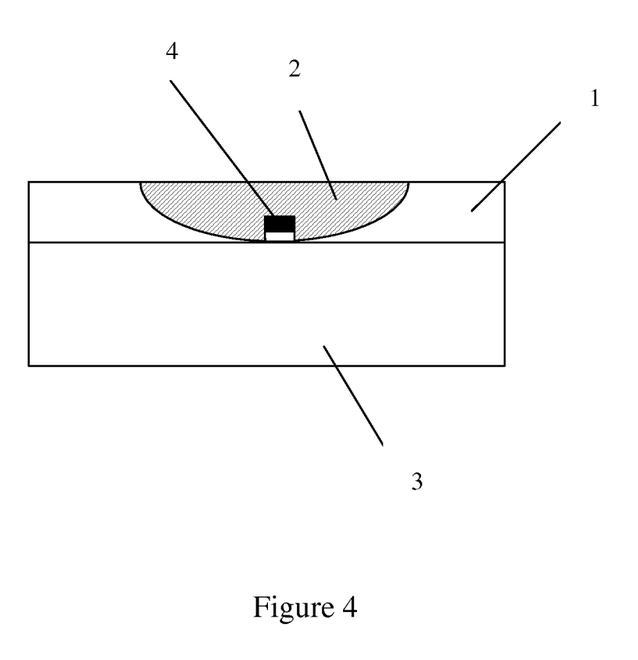
FIG. 4 is a schematic view showing the structure of another input device according to an embodiment of the present application.

Based on the input device according to the embodiments described above, this embodiment provides yet another input device. Reference is made to FIG. 4, in the input device according to this embodiment, a second panel 3 and a first panel 1 are detachable from each other. The second panel 3 is located under the first panel 1, and the first panel 1 and the second panel 3 are fixed by bonding or other processes.

In the input device having the structure as shown in FIG. 4, the second panel 3 is located under the first panel 1, and in order to increase a touch sensitive of the key input, a trigger device 4 may be arranged at a bottom of a silica gel pad 2. The trigger device 4 may be a conductive rubber or a metallic contact unit.

In the solution shown in FIG. 4, the silica gel pad 2 fully fills a corresponding groove, and a bottom of the trigger device 4 is higher than the bottom of the silica gel pad 2. In this way, when the silica gel pad 2 is not pressed, the trigger device 4 is not in contact with the bottom of the corresponding groove, that is, the trigger device 4 is not in contact with a sensing unit corresponding to the groove when no key operation is performed. And, when the silica gel pad 2 is pressed, the trigger device 4 is in contact with the bottom of the corresponding groove, that is, the trigger device 4 is in contact with the sensing unit corresponding to the groove to perform a trigger operation when a key operation is performed.

Figure 5:
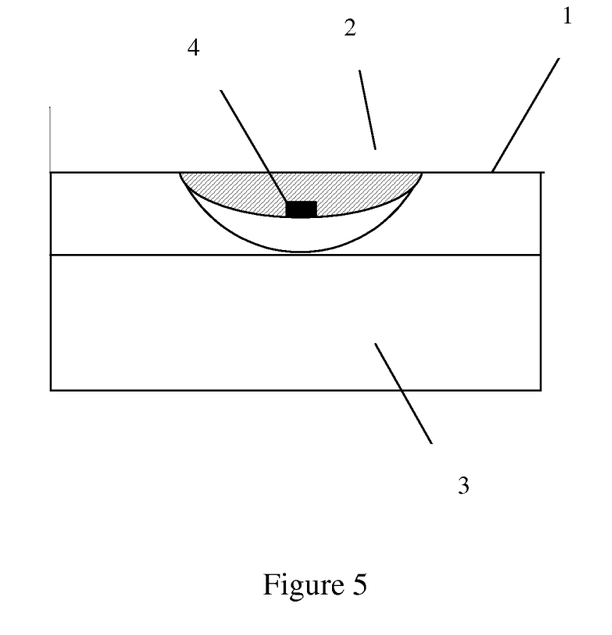
FIG. 5 is a schematic view showing the structure of yet another input device according to the present application.

Reference is made to FIG. 5, the bottom of the trigger device 4 may also be flushed with the bottom of the silica gel pad 2, and a gap is provided between the bottom of the silica gel pad 2 and the bottom of the corresponding groove, in this way, the following effect may also be realized, that is, when no key operation is performed, the trigger device 4 is not in contact with the sensing unit corresponding to the groove; and when the key operation is performed, the trigger device 4 is in contact with the sensing unit corresponding to the groove to perform a trigger operation.

Figure 6:
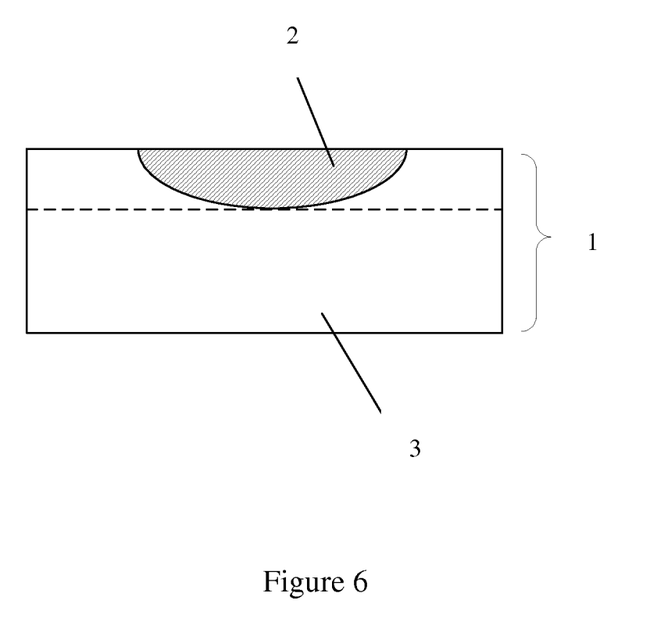
FIG. 6 is a schematic view showing the structure of yet another input device according to an embodiment of the present application.

Reference is made to FIG. 6, in other manners of the technical solution of the present application, the second panel 3 may be fused to a bottom of the first panel 1. The second panel 3 may be fused to the bottom of the first panel 1 by an in-cell technology, thereby forming an input device of an integrated structure.

It should be noted that, in the input device shown in FIG. 6, a dotted line indicating a boundary of the second panel 3 in the first panel 1 is only for a purpose of illustration, and in the actual integrated structure, the first panel 1 and the second panel 3 are integrated as a whole, and the boundary doesn't exist.

Sixth Embodiment

In order to implement the input devices according to the embodiments described above, all the sensing units may be arranged on the same capacitor plate. However, with all the sensing units arranged on the same capacitor plate, the entire capacitor plate is required to be repaired if any one of the input keys of the input device is damaged.

In order to facilitate maintenance and reducing the maintaining cost, this embodiment provides yet another input device. In the input device, N sensing units of the second panel are partitioned to multiple sections, and multiple sensing units in the same section are arranged at the same capacitor plate, that is, the second panel is consisted of multiple capacitor plates which are manufactured separately.

Figure 7:
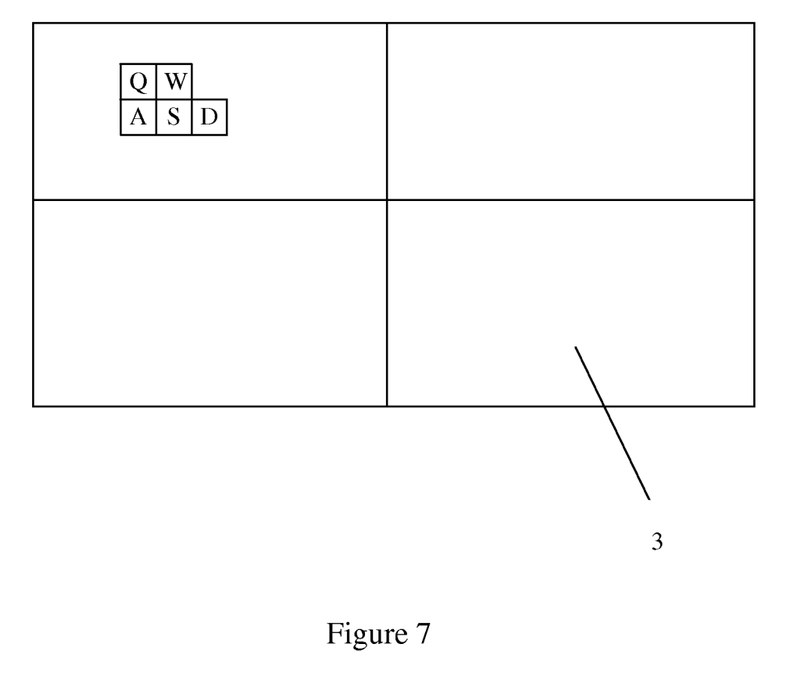
FIG. 7 is a schematic view showing the structure of yet another input device according to an embodiment of the present application.

In the input device as shown in FIG. 7, the second panel is divided into four sections. Each capacitor plate is provided with multiple sensing units, and a sum of the sensing units on all of the capacitor plates is N. Thus, in a case that one sensing unit of the input device is damaged, it is only required to repair the capacitor plate of the section having the damaged sensing unit, thereby reducing the maintaining cost of the device.

Since different keys have different frequencies of use, the capacitor plate in a section having keys with a high frequency of use is apt to be damaged in the process of using the input device according to the above embodiment.

In view of this, the multiple sensing units located at the same capacitor plate are partitioned again according to the different frequencies of use of keys corresponding to the sensing units, thus the capacitor plate may be divided into multiple capacitor sub-plates which may be manufactured separately. The capacitor sub-plate may include one or more sensing units. Every capacitor plate manufactured separately realizes a key operation via a separate controller, and all capacitors on the same capacitor plate are controlled by the same controller.

As shown in FIG. 7, four keys of A, S, W and D, which are commonly used as direction control keys in various games, are all located in a section at a top left corner. The capacitor plate of this section is likely to be damaged due to the high frequencies of use of the four keys. Therefore, in this embodiment, one or more of the four keys are separated from the capacitor plate of the section at the top left corner, and are arranged on another separate capacitor sub-plate, and are connected to the same controller together with other sensing units in the section at the top left corner.

Thus, when a sensing unit, corresponding to a key with a high frequency of use, on a capacitor sub-plate is damaged, it is only required to repair the capacitor sub-plate having the damaged sensing unit, thereby avoiding repair or replacement of the entire capacitor plate of the section which the damaged sensing unit is located, thereby reducing the maintaining cost.

Furthermore, since different sensing units at the same section are controlled by the same controller, a sensing unit with a low frequency of use may be arranged to have a key function of a sensing unit with a set high frequency of use through an operation method of the common controller. For example, in the input device as shown in FIG. 7, in a play mode, if the key Q is a key with a low frequency of use, the key Q may be arranged to have an input function of the key W. Thus, the frequency of use of a key with a high frequency of use may be reduced, which may further reduce a wear rate of the key, thereby further reducing the maintaining cost.

Seventh Embodiment

An embodiment of the present application provides yet another input device, which includes a first panel and a second panel. The second panel may be provided under the first panel or fused to a bottom of the first panel.

Figure 8:
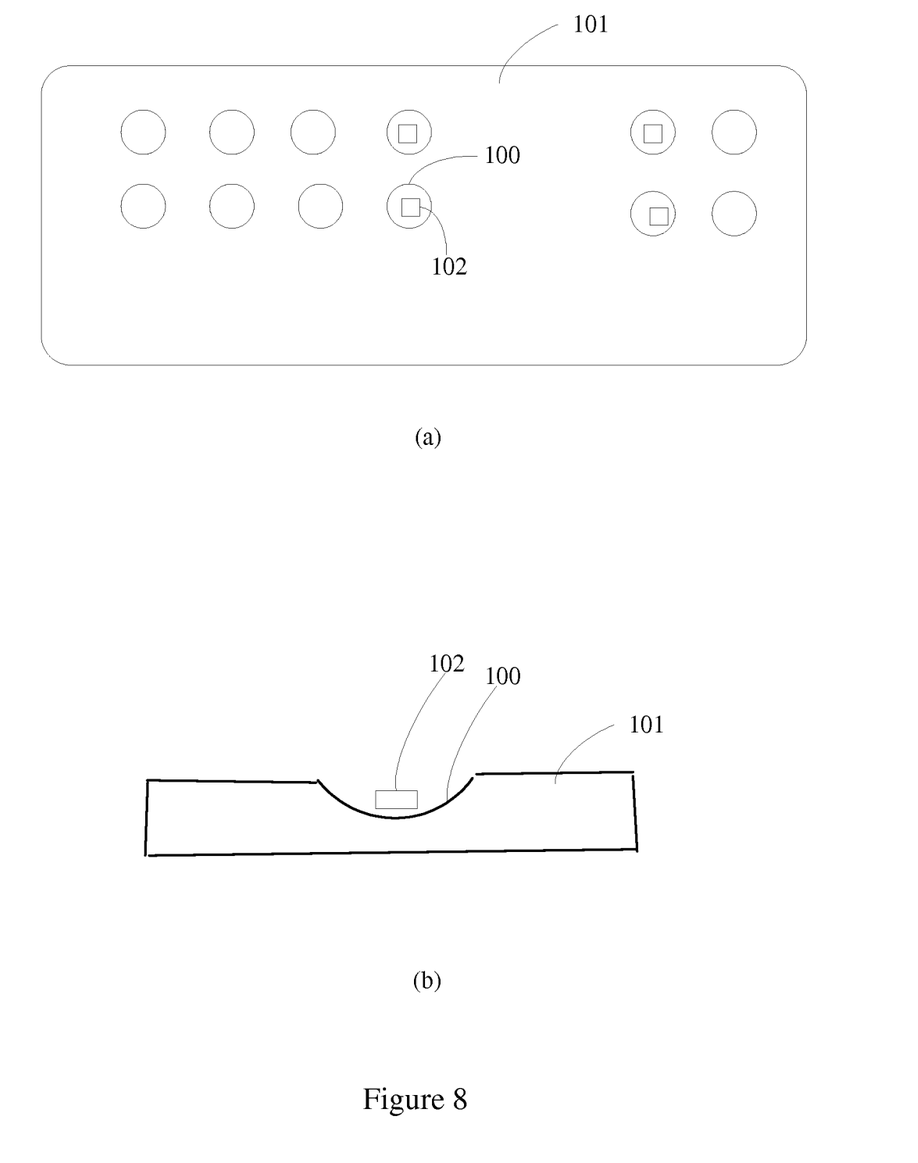
FIG. 8 is a schematic view showing the structure of yet another input device according to the present application.

Reference is made to FIGS. 8(a) and 8(b), the input device is a glass keyboard, and the first panel is a glass panel 101. The glass keyboard further includes an acquisition unit 102.

The glass panel 101 is provided with multiple grooves 100, and each groove 100 corresponds to one key.

The second panel includes a sensing unit configured to sense a key.

The acquisition unit 102 is arranged in the groove 100 of the glass panel to acquire an input operation of a user.

In one possible manner, the grooves on the glass panel may be each provided with an acquisition device. In another possible manner, a groove, corresponding to a set key, on the glass panel may be provided with an acquisition device.

In the glass keyboard according to this embodiment of the present application, the groove arranged on the glass panel is provided with the acquisition device, thus when a user presses the key on the glass keyboard, the acquisition device on the key may acquire the input operation of the user, thereby providing a good experience for the user.

Eighth Embodiment

An embodiment of the present application provides yet another input device, which includes a first panel and a second panel. The second panel may be provided under the first panel or fused to a bottom of the first panel.

Figure 9:
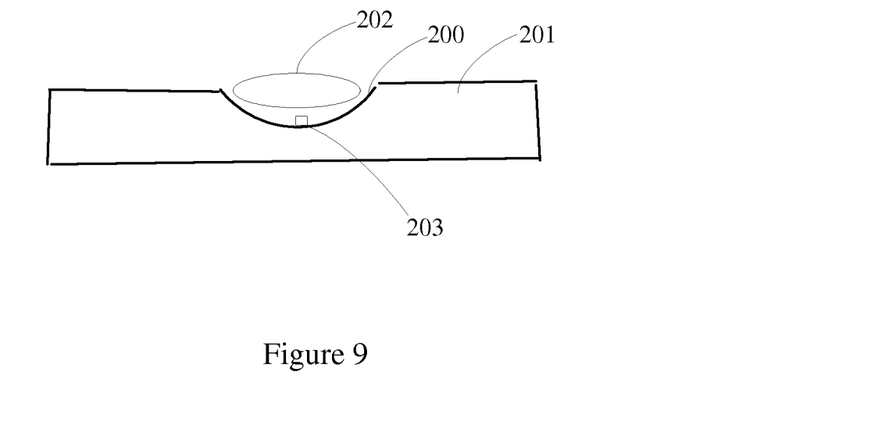
FIG. 9 is a schematic view showing the structure of yet another input device according to an embodiment of the present application.

Reference is made to FIG. 9, the input device is a glass keyboard, the first panel is a glass panel 201, and the glass keyboard further includes a silica gel 202 and an image acquisition unit 203.

The glass panel 201 is provided with multiple grooves 200, and each groove 200 corresponds to one key.

The second panel includes a sensing unit configured to sense a key.

The silica gel 202 is arranged in the groove 200, thus on one hand, keys of the glass keyboard are tactile, and on the other hand, a fingerprint of a user will be shown when the user presses the silica gel 202 with his finger.

The image acquisition device 203 is arranged below the silica gel 202. When the user operates on the silica gel 202 with his finger, the fingerprint of the user will be shown and an image of the fingerprint of the user may be captured by the image acquisition device 203.

The image acquisition device 203 according to this embodiment may be, but not limited to, a camera.

In one possible manner, the grooves on the glass panel may each be provided with the silica gel 202 and the image acquisition device 203. In another possible manner, a groove, corresponding to a set key, on the glass panel may be provided with the silica gel 202 and the image acquisition device 203, for example, grooves, corresponding to keys of "F" and "J", are both provided with the silica gel 202 and the image acquisition device 203.

According to this embodiment of the present application, the groove on the glass panel is provided with the silica gel and the image acquisition device. On one hand, the silica gel may bring a better key-touch feeling for a user; and on the other hand, the image acquisition device may capture the image of the fingerprint of the user when the user operates on the silica gel with his finger. The acquisition of the fingerprint image may increase the safety of the information input. For example, when the user inputs information via the glass keyboard of this embodiment, the glass keyboard may acquire the information corresponding to the key and the fingerprint image of the user at the same time, and the glass keyboard may determine whether to respond to the user's input operation according to the acquired fingerprint image, and only when the acquired fingerprint information matches the pre-stored user's fingerprint information, the glass keyboard will respond to the user's input operation. For example, when the user inputs a password, the glass keyboard verifies the key information inputted by the user, and the fingerprint information after the user's fingerprint information is acquired, and only both the two verifications are passed, a subsequent operation may be allowed. Thus, the acquisition of the fingerprint image improves the safety of the information input and provides a better experience for the user.

Ninth Embodiment

An embodiment of the present application provides yet another input device, which includes a first panel and a second panel. The second panel may be provided under the first panel or fused to a bottom of the first panel.

Figure 10:
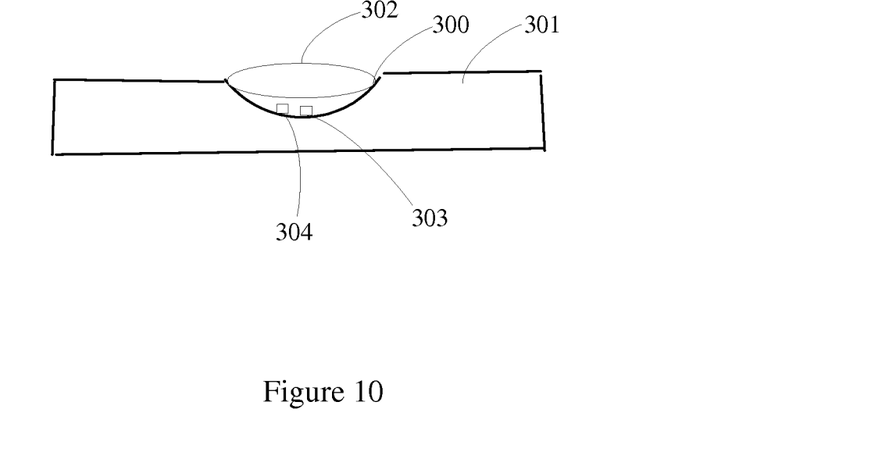
FIG. 10 is a schematic view showing the structure of yet another input device according to an embodiment of the present application.

Reference is made to FIG. 10, the input device is a glass keyboard, the first panel is a glass panel 301, and the glass keyboard further includes a silica gel 302, an image acquisition unit 303 and a pressure sensor 304.

The glass panel 301 is provided with multiple grooves 300, and each groove 300 corresponds to one key.

The second panel includes a sensing unit configured to sense a key.

The silica gel 302 is arranged in the groove 300, thus on one hand, keys of the glass keyboard are tactile, and on the other hand, a fingerprint of a user will be shown when the user presses the silica gel 302 with his finger.

The image acquisition device 303 is arranged below the silica gel 202. When the user operates on the silica gel 302 with his finger, the fingerprint of the user will be shown and an image of the fingerprint of the user may be captured by the image acquisition device 303.

The image acquisition device 303 according to this embodiment may be, but not limited to, a camera.

In actual use, if the user presses the silica gel 302 with his finger with a small force, the pattern of the user's fingerprint cannot be shown clearly, which causes the fingerprint image captured by the image acquisition device 303 being unclear. In order to capture clear fingerprint image, the pressure sensor 304 is provided on the glass keyboard according to this embodiment.

The pressure sensor 304 is arranged below the silica gel 302 to sense a pressure applied on the silica gel 302 by the finger of the user when the user presses the silica gel 302 with his finger.

In a case that a value of the pressure sensed by the press sensor 304 is greater than a set pressure value, the image acquisition device 303 captures the fingerprint image of the user. The set pressure value is a minimum pressure value that allows the fingerprint pattern of the user to be clearly shown via the silica gel 302.

In one possible manner, the grooves on the glass panel may each be provided with the silica gel 302, the image acquisition device 303 and the pressure sensor 304. In another possible manner, a groove, corresponding to a set key, on the glass panel may be provided with the silica gel 302, the image acquisition device 303 and the pressure sensor 304, for example, grooves, corresponding to keys of "F" and "J", are both provided with the silica gel 302, the image acquisition device 303 and the pressure sensor 304.

According to this embodiment of the present application, the groove on the glass panel is provided with the silica gel, the pressure sensor and the acquisition device. On one hand, the silica gel may bring a better key-touch feeling for a user; and on the other hand, when the user operates on the silica gel with his finger, the pressure sensor may sense the pressure applied on the silica gel by the user's finger, and when the pressure applied on the silica gel by the user's finger is greater than the set pressure value, the image acquisition device may acquire a clear fingerprint image. The acquisition of the fingerprint image may increase the safety of the information input. For example, when the user inputs information via the glass keyboard of this embodiment, the glass keyboard may acquire the information corresponding to the key and the fingerprint image of the user at the same time, and the glass keyboard may determine whether to respond to the user's input operation according to the acquired fingerprint image, and only when the acquired fingerprint information matches the pre-stored user's fingerprint information, the glass keyboard will respond to the user's input operation. For example, when the user inputs a password, the glass keyboard verifies the key information inputted by the user, and the fingerprint information after the user's fingerprint information is acquired, and only both the two verifications are passed, a subsequent operation may be allowed. Thus, the acquisition of the fingerprint image improves the safety of the information input and provides a better experience for the user.

Tenth Embodiment

An embodiment of the present application provides yet another input device, which includes a first panel and a second panel. The second panel may be provided under the first panel or fused to a bottom of the first panel.

Figure 11:
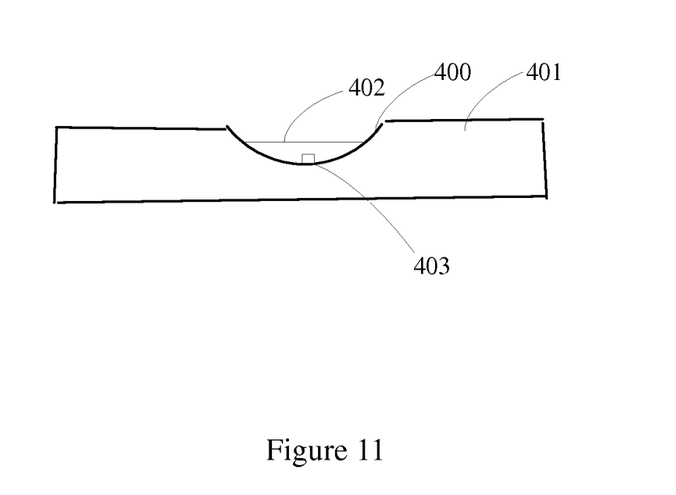
FIG. 11 is a schematic view showing the structure of yet another input device according to an embodiment of the present application.

Reference is made to FIG. 11, the input device is a glass keyboard, the first panel is a glass panel 401, and the glass keyboard further includes a lens 402 and an image acquisition unit 403.

The glass panel 401 is provided with multiple grooves 400, and each groove 400 corresponds to one key.

The second panel includes a sensing unit configured to sense a key.

The lens 402 is arranged at a bottom of the groove 400 to image the user's fingerprint.

The lens 402 may be a convergent lens, such as a magnifying glass, thus when the user operates on the convergent lens with his finger, on one hand, the user's fingerprint may be shown via the convergent lens; and on the other hand, the user's fingerprint may be magnified due to the magnifying function of the convergent lens.

The image acquisition device 403 is arranged below the lens 402. When the user operates on the lens 402 with his finger, an image of the fingerprint of the user may be captured by the image acquisition device 403. It should be noted that, the imaging effect of the lens 403 varies with a distance between the finger and the lens 403. In a case that the distance between the finger and the lens 403 is larger than twice the focal length, the lens 403 has a minifying function; and in a case that the distance between the finger and the lens 403 is between the focal length and twice the focal length, the lens 403 has a magnifying function; and in a case that the distance between the finger and the lens 403 equals to twice the focal length, the lens 403 has neither the magnifying function nor the minifying function.

Preferably, in order to capture a clear and magnified fingerprint image, the image acquisition device is arranged to capture the fingerprint image only when the distance between the finger and the lens 403 is between the focal length and twice the focal length.

The image acquisition device 303 according to this embodiment may capture the clear and magnified fingerprint image via the lens 402. The image acquisition device 303 may be, but not limited to, a camera.

Furthermore, the glass keyboard may capture and identify spatial gestures via the image acquisition device 303. Multiple cameras may be provided to capture an image of a spatial gesture and further identify the spatial gesture of the user from the captured image of the spatial gesture.

In one possible manner, the grooves on the glass panel may each be provided with the lens 402 and the image acquisition device 403. In another possible manner, a groove, corresponding to a set key, on the glass panel may be provided with the lens 402 and the image acquisition device 403, for example, grooves, corresponding to keys of "F" and "J", are both provided with the lens 402 and the image acquisition device 403.

According to this embodiment of the present application, the groove on the glass panel is provided with the lens and the image acquisition device, thus the image acquisition device may capture the image of the fingerprint of the user when the user operates on the lens with his finger. In a case that the distance between the finger and the lens is between the focal length and twice the focal length, the image acquisition device may capture a magnified fingerprint image. The acquisition of the fingerprint image may increase the safety of the information input. For example, when the user inputs information via the glass keyboard of this embodiment, the glass keyboard may acquire the information corresponding to the key and the fingerprint image of the user at the same time, and the glass keyboard may determine whether to respond to the user's input operation according to the acquired fingerprint image, and only when the acquired fingerprint information matches the pre-stored user's fingerprint information, the glass keyboard will respond to the user's input operation. For example, when the user inputs a password, the glass keyboard verifies the key information inputted by the user, and the fingerprint information after the user's fingerprint information is acquired, and only both the two verifications are passed, a subsequent operation may be allowed. Thus, the acquisition of the fingerprint image improves the safety of the information input and provides a better experience for the user.

Eleventh Embodiment

An embodiment of the present application provides yet another input device, which includes a first panel and a second panel. The second panel may be provided under the first panel or fused to a bottom of the first panel.

Figure 12:
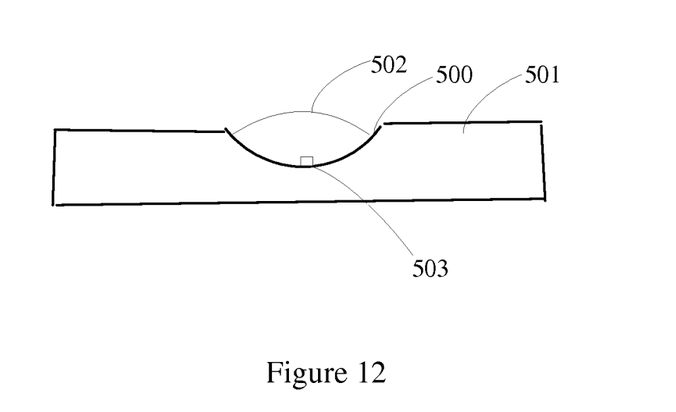
FIG. 12 is a schematic view showing the structure of yet another input device according to an embodiment of the present application.

Reference is made to FIG. 12, the input device is a glass keyboard, the first panel is a glass panel 501, and the glass keyboard further includes a convex mirror 502 and an image acquisition unit 503.

The glass panel 501 is provided with multiple grooves 500, and each groove 500 corresponds to one key.

The second panel includes a sensing unit configured to sense a key.

The convex mirror 502 is used to image the user's fingerprint.

The image acquisition device 503 is arranged below the convex mirror 502. When the user operates on the convex mirror 502 with his finger, an image of the fingerprint of the user may be captured by the image acquisition device 503. The image acquisition device 503 may capture a clear fingerprint image via the convex mirror 502. The image acquisition device 503 according to this embodiment may be, but not limited to, a camera.

Furthermore, the glass keyboard may capture and identify spatial gestures via the image acquisition device 503. Multiple cameras may be provided to capture an image of a spatial gesture and further identify the spatial gesture of the user from the captured image of the spatial gesture.

In one possible manner, the grooves on the glass panel may each be provided with the convex mirror 502 and the image acquisition device 503. In another possible manner, a groove, corresponding to a set key, on the glass panel may be provided with the convex mirror 502 and the image acquisition device 503, for example, grooves, corresponding to keys of "F" and "J", are both provided with the convex mirror 502 and the image acquisition device 503.

According to this embodiment of the present application, the groove on the glass panel is provided with the convex mirror and the image acquisition device, thus the image acquisition device may capture the image of the fingerprint of the user when the user operates on the convex mirror with his finger. The acquisition of the fingerprint image may increase the safety of the information input. For example, when the user inputs information via the glass keyboard of this embodiment, the glass keyboard may acquire the information corresponding to the key and the fingerprint image of the user at the same time, and the glass keyboard may determine whether to respond to the user's input operation according to the acquired fingerprint image, and only when the acquired fingerprint information matches the pre-stored user's fingerprint information, the glass keyboard will respond to the user's input operation. For example, when the user inputs a password, the glass keyboard verifies the key information inputted by the user, and the fingerprint information after the user's fingerprint information is acquired, and only both the two verifications are passed, a subsequent operation may be allowed. Thus, the acquisition of the fingerprint image improves the safety of the information input and provides a better experience for the user.

Twelfth Embodiment

An embodiment of the present application provides yet another input device, which includes a first panel and a second panel. The second panel may be provided under the first panel or fused to a bottom of the first panel.

Figure 13:
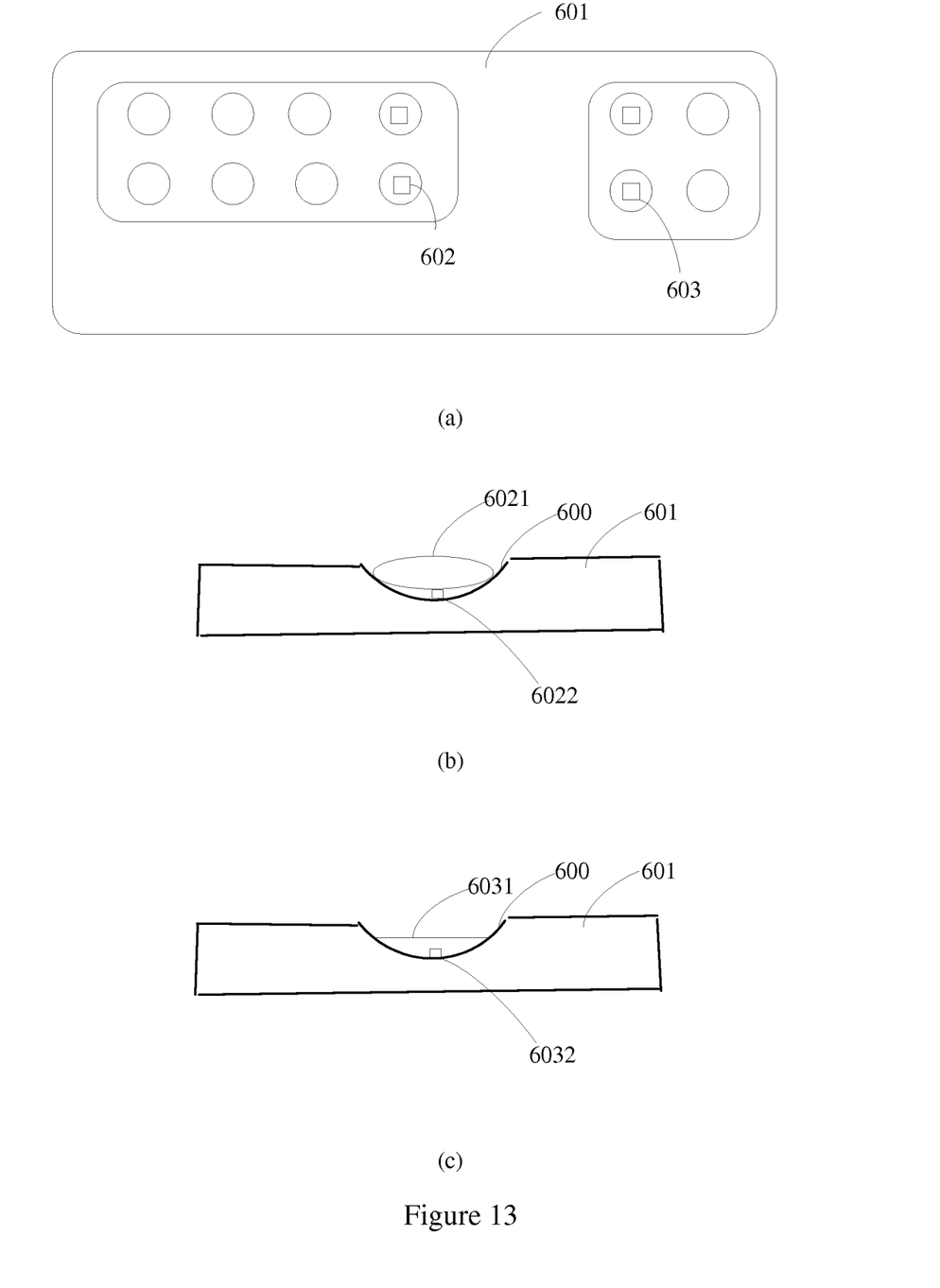
FIG. 13 is a schematic view showing the structure of yet another input device according to an embodiment of the present application.

Reference is made to FIGS. 13 (a), (b) and (c), the input device is a glass keyboard, the first panel is a glass panel 601, and the glass keyboard further includes a first acquisition device 602 and a second acquisition device 603.

The glass panel 601 is provided with multiple grooves 600, and each groove 600 corresponds to one key.

The second panel includes a sensing unit configured to sense a key.

The glass panel 601 according to this embodiment is divided into at least two sections including a first section and a second section.

The first acquisition device 602 is arranged in a groove of the first section, and may include a silica gel 6021 and an image acquisition device 6022.

The silica gel 6021 is arranged in the groove, thus on one hand, keys of the glass keyboard are tactile, and on the other hand, a fingerprint of a user will be shown when the user presses the silica gel 6021 with his finger. The image acquisition device 6022 is arranged below the silica gel 6021, thus when the user operates on the silica gel 6021 with his finger, the fingerprint of the user will be shown and an image of the fingerprint of the user may be captured by the image acquisition device 6022.

Since a part of keys of the glass keyboard are frequently-used keys, such as letter keys, and these frequently-used keys have a high requirement for touch feeling. In view of this, in this embodiment, the first section may be arranged as a letter-key section, and grooves corresponding to the keys in this section are each provided with the silica gel 6021 and the image acquisition device 6022. Thus on one hand, the silica gel may bring a better key-touch feeling for the user, and on the other hand, a fingerprint of the user will be shown when the user presses the silica gel with his finger.

Optionally, the groove of the first section may be further provided with a pressure sensor. The pressure sensor is arranged below the silica gel to sense a pressure applied on the silica gel 6021 by the finger of the user when the user presses the silica gel 6021 with his finger. In a case that a value of the pressure sensed by the press sensor is greater than a set pressure value, the image acquisition device 6022 captures the fingerprint image of the user. The set pressure value is a minimum pressure value that allows the fingerprint pattern of the user to be clearly shown via the silica gel 6021.

The second acquisition device 603 is arranged in a groove of the second section, and may include a lens 6031 and an image acquisition device 6032.

The lens 6031 is arranged at a bottom of the groove to image the user's fingerprint. The image acquisition device 6032 is arranged below the lens 6031. When the user operates on the lens 6031 with his finger, an image of the fingerprint of the user may be captured by the image acquisition device 6032. The image acquisition device 6032 may capture a clear and magnified fingerprint image via the lens 6031.

Furthermore, the glass keyboard may capture and identify spatial gestures via the image acquisition device 6032. Multiple cameras may be provided to capture an image of a spatial gesture and further identify the spatial gesture of the user from the captured image of the spatial gesture.

According to this embodiment of the present application, different sections of the glass panel are provided with different acquisition devices. The groove of the first section is provided with the silica gel and the image acquisition device, thereby bringing a better key-touch feeling for the user and capturing the fingerprint image of the user at the same time. The groove of the second section is provided with the lens and the image acquisition device, thereby capturing both the fingerprint image and the input gesture of the user. The user may have different feelings with different acquisition devices being arranged in different sections. The acquisition of the fingerprint image may increase the safety of the information input. For example, when the user inputs information via the glass keyboard of this embodiment, the glass keyboard may acquire the information corresponding to the key and the fingerprint image of the user at the same time, and the glass keyboard may determine whether to respond to the user's input operation according to the acquired fingerprint image, and only when the acquired fingerprint information matches the pre-stored user's fingerprint information, the glass keyboard will respond to the user's input operation. For example, when the user inputs a password, the glass keyboard verifies the key information inputted by the user, and the fingerprint information after the user's fingerprint information is acquired, and only both the two verifications are passed, a subsequent operation may be allowed. Thus, the acquisition of the fingerprint image improves the safety of the information input and provides a better experience for the user.

Thirteenth Embodiment

Based on the embodiments described above, this embodiment provides an electronic device including a display device configured to display data, and an input device integrated with the display device and configured to input data.

The input device includes a first panel and a second panel, the first panel is provided with M grooves, M is an integer that is greater than 1 or equal to 1; the second panel is located under the first panel or fused to a bottom of the first panel, and the second panel includes N sensing units each configured to sense a key, and N is an integer that is greater than 1 or equal to 1, and is not less than M.

In a case that M equals to N, that is, the grooves are in one-to-one correspondence with the sensing units, and the electronic device is an electronic device without mechanical keys. In a case that M is less than N, the electronic device is an electronic device with mechanical keys.

The electronic device according to this embodiment may be a portable electronic device, such as a laptop, and the input device may be an integrated keyboard for the laptop.

The input device may employ any one of the above implementation manners of the above embodiments according to the design requirement of the electronic device.

In the input device according to each of the above embodiments, each of the grooves is arranged to correspond to one key area, and a key command may be input by performing a touch key operation on a corresponding sensing unit under the groove. Compared with the conventional input device, in the technical solutions of the embodiments, the input of the key command may be realized without key caps and scissor-shaped structures for supporting the key caps, thereby shortening the key travel and reducing the thickness of the input device. At the same time, the groove has a function of key positioning. Therefore, the electronic device having the above input device conforms to the modern idea for manufacturing ultra-thin electronic devices.

The descriptions above are only exemplary embodiments of the present application. It should be noted that, for the person skilled in the art, many improvements and modifications may be made to the present application without departing from the principle of the present application. The protection scope of the present application is defined by the claims.

The invention claimed is:

1. An input device, comprising:
a first panel, provided with multiple grooves; and
a second panel, located under the first panel or fused to a bottom of the first panel, wherein the second panel includes multiple sensing units each configured to sense a respective key, wherein the multiple sensing units are located below the multiple grooves, and wherein each of the multiple grooves corresponds to a respective one of the multiple sensing units.

2. The input device according to claim 1, wherein:
a total number of the multiple grooves provided on the first panel is M,
M is an integer that is greater than 1,
a total number of the multiple sensing units provided on the second panel is N, and
N is an integer that is greater than or equal to M.

3. The input device according to claim 2, further comprising:
a silica gel pad arranged in a first groove of the multiple grooves, wherein the first groove corresponds to a first sensing unit of the multiple sensing units.

4. The input device according to claim 3, wherein:
the second panel is located under the first panel, and
the second panel and the first panel are detachable panels.

5. The input device according to claim 4, wherein:
a bottom of the silica gel pad is provided with a conductive rubber, and
in response to the silica gel pad being pressed, the conductive rubber contacts the first sensing unit to perform a trigger operation.

6. The input device according to claim 4, wherein:
a bottom of the silica gel pad is provided with a metallic contact unit, and
in response to the silica gel pad being pressed, the metallic contact unit contacts the first sensing unit to perform a trigger operation.

7. The input device according to claim 3, wherein:
the second panel is fused to the bottom of the first panel,
the multiple sensing units are partitioned into a plurality of sections,
for each section of the plurality of sections, a plurality of the multiple sensing units located in the section is arranged at a common capacitor plate corresponding to a controller.

8. The input device according to claim 7, wherein:
for a first capacitor plate of the capacitor plates, the plurality of the multiple sensing units located in the first capacitor plate is partitioned according to a frequency of use of each of the respective keys, and
the first capacitor plate is divided into a plurality of capacitor sub-plates that are manufactured separately.

9. The input device according to claim 3, wherein a height of the silica gel pad is not greater than a height of the first groove.

10. The input device according to claim 2, wherein the first panel is a glass plate.

11. The input device according to claim 2, wherein:
the input device is configured to be integrated with an electronic device that requires a mechanical key, and,
N is greater than M.

12. The input device according to claim 2, wherein:
the input device is configured as an external input device for an electronic device, or is configured to be integrated with an electronic device without a mechanical key, and
M is equal to N.

13. The input device according to claim 1, wherein:
the first panel is a glass panel,
the input device further comprises an acquisition device configured to acquire an input operation of a user,
the multiple grooves are arranged on the glass panel,
each groove of the multiple grooves corresponds to a respective key; and
the acquisition device is arranged in a first groove of the multiple grooves on the glass panel.

14. The input device according to claim 13, further comprising a silica gel and an image acquisition device, wherein:
the image acquisition device is arranged below the silica gel, and is configured to capture an image of a fingerprint of the user.

15. The input device according to claim 14, wherein the acquisition device comprises:
a pressure sensor arranged below the silica gel to sense a pressure applied on the silica gel, wherein in response to a value of the sensed pressure being greater than a preset pressure value, the image acquisition device captures the image of the fingerprint of the user.

16. The input device according to claim 13, wherein:
   the acquisition device comprises a lens and an image acquisition device,
   the lens is arranged at a bottom of the groove to image a fingerprint of the user, and
   the image acquisition device is arranged below the lens, and is configured to capture an image of the fingerprint of the user.

17. The input device according to claim 13, wherein the acquisition device comprises:
   a convex mirror configured to image a fingerprint of the user; and
   an image acquisition device arranged below the convex mirror and configured to capture an image of the fingerprint of the user.

18. The input device according to claim 13, wherein the acquisition device is provided in each groove of the multiple grooves on the glass panel.

19. The input device according to claim 13, wherein the first groove corresponds to a set key provided on the glass panel.

20. The input device according to claim 13, wherein:
   the glass panel is divided into at least two sections including a first section and a second section,
   the acquisition device is arranged in the first section,
   the acquisition device includes a silica gel and an image acquisition device,
   the acquisition device is arranged below the silica gel and is configured to capture an image of a fingerprint of the user,
   the acquisition device includes a lens and an image acquisition device,
   the lens is arranged at a bottom of the first groove, and
   the image acquisition device is configured to capture the image of the fingerprint of the user.

* * * * *